(12) United States Patent
Thornton et al.

(10) Patent No.: US 9,255,527 B2
(45) Date of Patent: Feb. 9, 2016

(54) USE OF AN EMISSIONS SENSOR TO CONTROL FUEL FLOW STAGING

(71) Applicant: Rolls-Royce Engine Control Systems Ltd., Derby (GB)

(72) Inventors: Paul Robert Thornton, Littleover (GB); Yong Qin, Heatherton Village (GB)

(73) Assignee: ROLLS-ROYCE CONTROLS AND DATA SERVICES LIMITED, Derby (GB)

( * ) Notice: Subject to any disclaimer, the term of this patent is extended or adjusted under 35 U.S.C. 154(b) by 488 days.

(21) Appl. No.: 13/652,883

(22) Filed: Oct. 16, 2012

(65) Prior Publication Data

US 2013/0091857 A1    Apr. 18, 2013

(30) Foreign Application Priority Data

Oct. 18, 2011    (GB) .................................. 1117942.1

(51) Int. Cl.
| | |
|---|---|
| F02C 9/28 | (2006.01) |
| F23N 5/00 | (2006.01) |
| F23R 3/34 | (2006.01) |
| F02C 9/26 | (2006.01) |
| F02C 9/34 | (2006.01) |

(52) U.S. Cl.
CPC ... *F02C 9/28* (2013.01); *F02C 9/26* (2013.01); *F02C 9/34* (2013.01); *F23N 5/003* (2013.01); *F23R 3/346* (2013.01); *F05D 2270/303* (2013.01)

(58) Field of Classification Search
CPC .......... F05D 2270/31; F05D 2270/083; F05D 2270/0831; F05D 2270/303; F05D 2270/313; F23N 5/003; F23N 5/08; F23N 2900/05001; F23N 2900/05002; F23N 2900/05003; F23R 3/346; F02C 7/228; F02C 9/28
See application file for complete search history.

(56) References Cited

U.S. PATENT DOCUMENTS

| | | | |
|---|---|---|---|
| 5,743,079 A | 4/1998 | Walsh et al. | |
| 2004/0011050 A1* | 1/2004 | Inoue | 60/773 |
| 2005/0107941 A1* | 5/2005 | Healy | 701/100 |
| 2010/0300108 A1 | 12/2010 | Demougeot et al. | |
| 2011/0067408 A1* | 3/2011 | Maly et al. | 60/772 |

FOREIGN PATENT DOCUMENTS

| | | |
|---|---|---|
| DE | 102006019723 | 4/2006 |
| EP | 2025902 | 2/2009 |
| GB | 2451144 | 2/2009 |
| JP | 2009156113 | 7/2007 |
| WO | 2998068330 | 6/2008 |

OTHER PUBLICATIONS

British Search Report dated Jan. 25, 2012 for Application No. GB1117942.1.

* cited by examiner

*Primary Examiner* — Phutthiwat Wongwian
*Assistant Examiner* — Marc Amar
(74) *Attorney, Agent, or Firm* — Oliff PLC

(57) ABSTRACT

A fuel system comprises a fuel actuation arrangement 28 operable to split a metered flow of fuel into at least a first stream and a second stream, a control unit 25 controlling the operation of the fuel actuation arrangement 28, and wherein the control unit 25 controls the operation of the fuel actuation arrangement 28 in response to the output of a temperature sensor 34 sensitive to a gas temperature downstream of the high pressure compressor 14 of an associated engine and the output of a gas sensor 24 sensitive to at least one parameter of the composition of a gas downstream of a combustor 15 of the engine.

14 Claims, 3 Drawing Sheets

USE OF AN EMISSIONS SENSOR TO CONTROL FUEL FLOW STAGING

This invention relates to a fuel system and in particular to a fuel system for use in supplying fuel to an aircraft engine.

It is becoming increasingly common for the fuel supplied to an aircraft engine to be split into a plurality of streams for delivery to the engine via separate injectors or separate parts of an injector. For example, division of fuel into a primary flow and a secondary flow is becoming commonplace. In order to maximise the benefits achievable by dividing the flow of fuel in this manner, it is desirable to be able to accurately divide or split the fuel supply into the relevant streams in a desired ratio. A number of arrangements have been devised for dividing or splitting the supplied fuel in this manner.

The ideal parameter for use in determining what the split ratio of fuel should be is the combustion flame temperature. Use of this parameter in controlling the split ratio should enable significant enhancements to fuel combustion efficiency, minimising emissions and maximising engine performance and life. However, the typical modern peak combustion flame temperature is too high to be measured directly in a convenient manner in normal use.

Rather than measure combustion flame temperature directly and use it in controlling the split ratio, systems have been devised in which other parameters which, to some extent, track the combustion flame temperature have been used. For example, GB2451144 describes a system in which the temperature at the high pressure compressor exit is used in controlling the split ratio. During steady state conditions, the relationship between this temperature and the combustion flame temperature is sufficiently consistent that it can provide good control over the split ratio. However, during fast transient conditions this relationship breaks down. It has further been found to be unreliable in inclement weather conditions, and is also affected by engine deterioration and failure of certain engine components such as air bleed valves.

U.S. Pat. No. 5,743,079 describes an arrangement in which a number of parameters are used in combination in controlling or regulating the supply of fuel. Specifically, the arrangement of U.S. Pat. No. 5,743,079 makes use of the high pressure compressor exit temperature and/or pressure, fuel flow rate, combustor pressure drop and high pressure turbine nozzle guide vane capacity. The number of parameters involved, and number of sensors required to detect the various parameters, results in the arrangement being very susceptible to sensor faults or inaccuracies.

EP2025902 describes an arrangement in which a range of parameters including gas temperature and pressure at various locations within an engine are used in controlling the operation thereof.

It is an object of the invention to provide a fuel system in which at least some of the disadvantages set out hereinbefore can be overcome or of reduced impact.

According to the present invention there is provided a fuel system comprising a fuel actuation arrangement operable to split a metered flow of fuel into at least a first stream and a second stream, a control unit controlling the operation of the fuel actuation arrangement, and wherein the control unit controls the operation of the fuel actuation arrangement in response to the output of a temperature sensor sensitive to a gas temperature downstream of the high pressure compressor of an associated engine and the output of a gas sensor sensitive to at least one parameter of the composition of a gas downstream of a combustor of the engine.

Preferably, the temperature sensor is sensitive to the temperature at the exit of the high pressure compressor.

It has been found that the combustion flame temperature can be derived, with good accuracy, using the temperature at the exit of the high pressure compressor in combination with data representative of at least one parameter of the composition of the gases downstream of the combustor. By using these parameters in combination in controlling the fuel actuation arrangement, therefore, enhancements in the combustion process and engine performance can be attained.

The parameter to which the gas sensor is sensitive may be the oxygen, carbon dioxide, carbon monoxide and/or other content of the gas downstream of the combustor.

The gas sensor is conveniently located adjacent the exit of the low pressure turbine stage. For example, it may be located at the gas path of the low pressure turbine outlet guide vane or its exit. However, it will be appreciated that this need not be the case, and that the gas sensor may be located elsewhere in the engine. Whilst reference is made hereinbefore to a single gas sensor, it will be appreciated that in practise a plurality of such sensors may be provided.

The gas sensor is conveniently a carbon dioxide sensor, an oxygen sensor or other gas composition measurement sensor. Preferably it is of the laser-detector type. Such an arrangement is advantageous in that only the probe of the sensor will need to be located in the engine, the remainder of the sensor, for example an analysis circuit thereof, being able to be located remotely, for example at the control unit, and connected to the probe by, for example, one or more optical fibres. Conveniently, a first optical fibre is used to carry a laser output to the probe, and a second optical fibre carries the measurement back to the remainder of the sensor.

Preferably, the gas sensor output and temperature sensor output are used in combination to derive a calculated combustion flame temperature value which is used by the control unit in controlling the operation of the fuel actuation arrangement.

The gas sensor output and temperature sensor output are conveniently used as inputs to a combustor temperature rise calculation software routine to derive a difference value. The difference value is conveniently representative of a difference between the sensed temperature and the combustion flame temperature. The calculated combustion flame temperature can be determined, therefore, by calculating the sum of the temperature sensor output and the difference value. The control unit conveniently undertakes this calculation. The combustor temperature rise calculation software routine is conveniently generated during a calibration operation in which an energy conservation relationship is derived based on the amount of fuel burnt during the combustion process.

The invention further relates to a method of controlling the operation of a fuel system comprising the steps of sensing a parameter of the gas composition and a temperature, and using the sensed gas composition parameter and temperature in controlling the operation of a fuel actuation arrangement to split a fuel supply into a first stream and a second stream.

The fuel system may take a range of forms. For example, the fuel actuation arrangement may comprise a splitter valve operable to split the metered flow of fuel into the first stream and the second stream, and a metering valve metering the first and second streams, the control unit controlling the operation of the splitter valve and the metering valve. Alternatively, the fuel actuation arrangement may comprise a splitter valve only, with the control unit controlling the operation of the splitter valve. The fuel actuation arrangement may be common to a plurality of injectors. Alternatively, a plurality of fuel actuation arrangements may be provided, each being associated with a respective injector, or incorporated into an associated injector. Such an arrangement may permit a reduction in the number of fuel manifolds and so avoids or reduces problems associated with stagnation of fuel.

The invention will further be described, by way of example, with reference to the accompanying drawings, in which.

Figure 1:
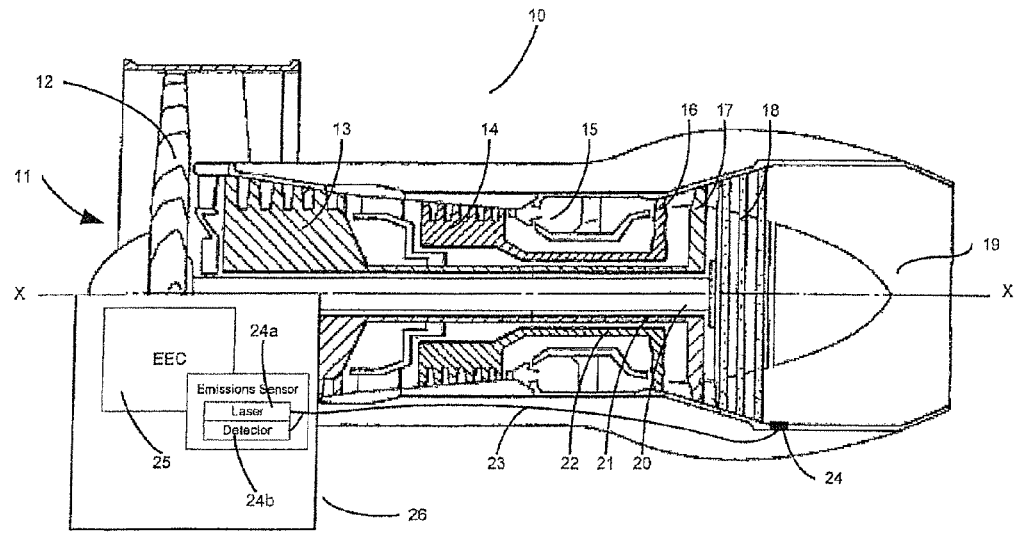
FIG. 1 illustrates an engine incorporating a fuel system in accordance with an embodiment of the invention.

Referring firstly to FIG. 1, an aircraft gas turbine engine 10 is illustrated, diagrammatically, and comprises an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19. In use, the gas turbine engine 10 operates in a conventional manner so that air entering the intake 11 is accelerated by the propulsive fan 12 which produces two air flows: a first air flow enters the intermediate pressure compressor 13 and a second air flow enters a by-pass duct and exhausts the engine to provide propulsive thrust. The intermediate pressure compressor 13 compresses and delivers the first air flow at an intermediate pressure to the high pressure compressor 14. The high pressure compressor 14 further compresses the first air flow and delivers it to the combustor 15. Within the combustor 15, the compressed air from the high pressure compressor 14 is mixed with fuel and a combustion reaction takes place. The hot combustion products then expand rapidly and thereby drive the high, intermediate and low pressure turbines 16, 17, 18, before being exhausted through the nozzle 19 to provide additional propulsive thrust. The high, intermediate and low pressure turbines 16, 17, 18 are respectively drivingly interconnected with the high and intermediate pressure compressors 14, 13 and fan 12 via high speed, intermediate speed and low speed shafts 22, 21, 20. External to the fan 12 is the fancase 26 where the electronic engine controller (EEC) 25 and other components such as the fuel pump are located.

Figure 2:
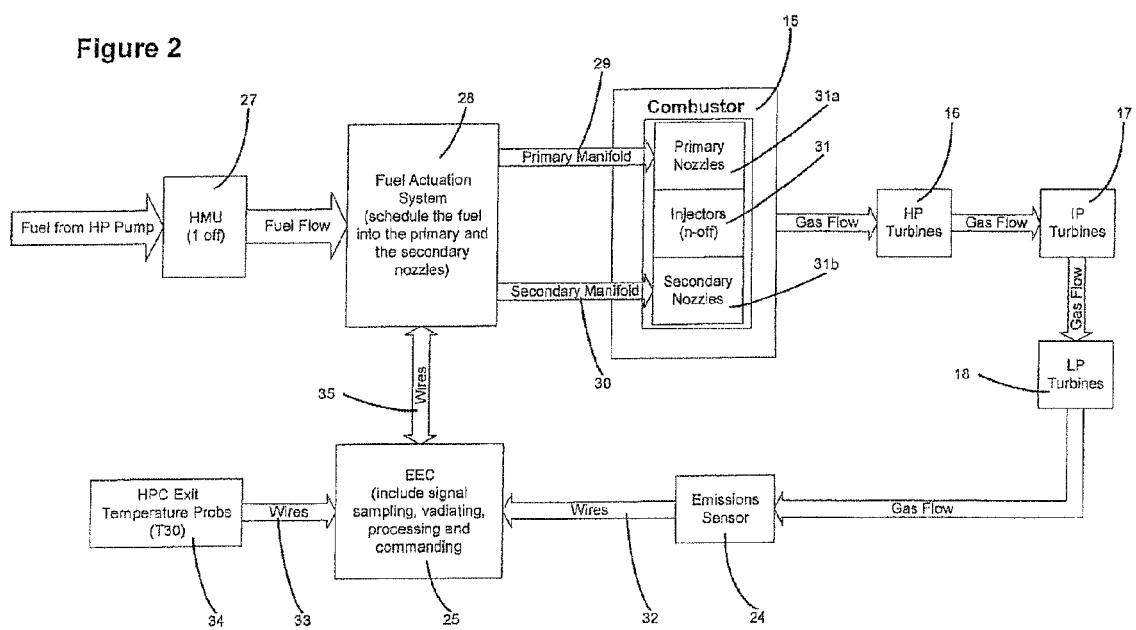
FIG. 2 is a diagrammatic representation of a fuel system in accordance with an embodiment of the invention.

As shown in FIG. 2, the fuel is delivered through a series of injectors 31, each of which includes a primary nozzle 31a and a secondary nozzle 31b. A fuel actuation arrangement 28 serves to divide or split an incoming metered supply of fuel from a metering unit 27 into respective primary and secondary streams supplied via respective manifolds 29, 30.

The fuel actuation arrangement 28 can comprise a splitter valve and a metering valve controlling the supply of fuel along the primary and secondary manifolds 29, 30. If the proportion of fuel flowing through the respective manifolds 29, 30 needs to be changed then the positions of the metering valve and the splitter valve are altered to change these proportions. The respective positions of the metering valve and the splitter valve in the fuel actuation arrangement 28 are monitored using known position sensing devices with signals from these devices being transmitted to a control unit 25 via wires 35. It is recognised that the fuel actuation arrangement 28 could alternatively be comprised of a splitter valve only. The control unit 25 controls the operation of, for example, the fuel actuation arrangement 28 via wires 35, and a number of other components of the fuel system, in response to a number of inputs. In relation to control over the operation of the fuel actuation arrangement 28 the control unit 25 operates in response to inputs transmitted via wires 32, 33, 35 and related to the temperature at the exit of the high pressure compressor 14, sensed by a temperature sensor 34 and the output of a gas sensor 24 sensitive to a parameter of the composition of the gas downstream of the combustor 15, along with the aforementioned position signals that provide the status of the fuel actuation arrangement 28. The gas sensor 24 could be sensitive to a range of parameters of the gas composition, for example it could be sensitive to the oxygen or carbon dioxide content thereof. In the arrangement illustrated, it is sensitive to the carbon dioxide content of the gas downstream of the combustor 15. As it is sensitive to the composition of the gas downstream of the combustor 15, it may also be referred to as an emissions sensor.

For convenience, as illustrated in FIG. 1, the gas sensor 24 is located adjacent the exit of the low pressure turbine section 18, at the gas path of the outlet guide vane. However, this need not always be the case and other locations for the gas sensor 24 are possible without departing from the scope of the invention. This location of the sensor 24 is convenient as it avoids having to place the sensor 24 in an area of extremely high temperature.

Figure 4A:
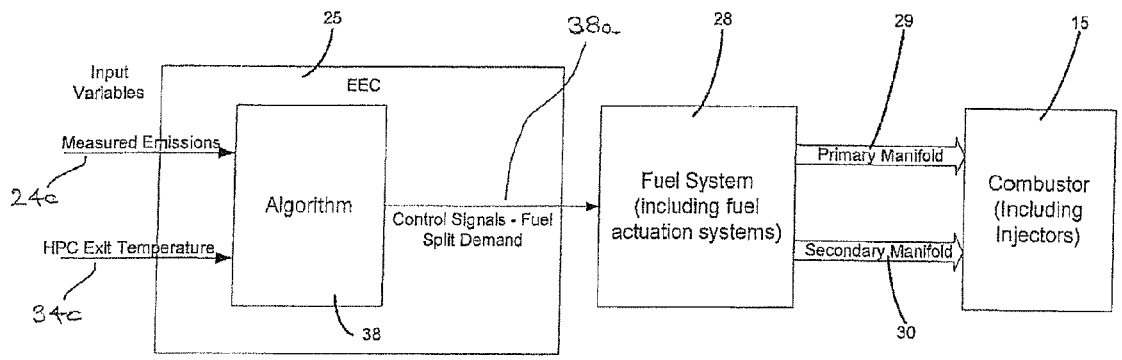
FIGS. 4a and 4b are diagrams illustrating part of the process undertaken by the control unit in the arrangements illustrated in FIGS. 1 to 3.
Figure 4B:
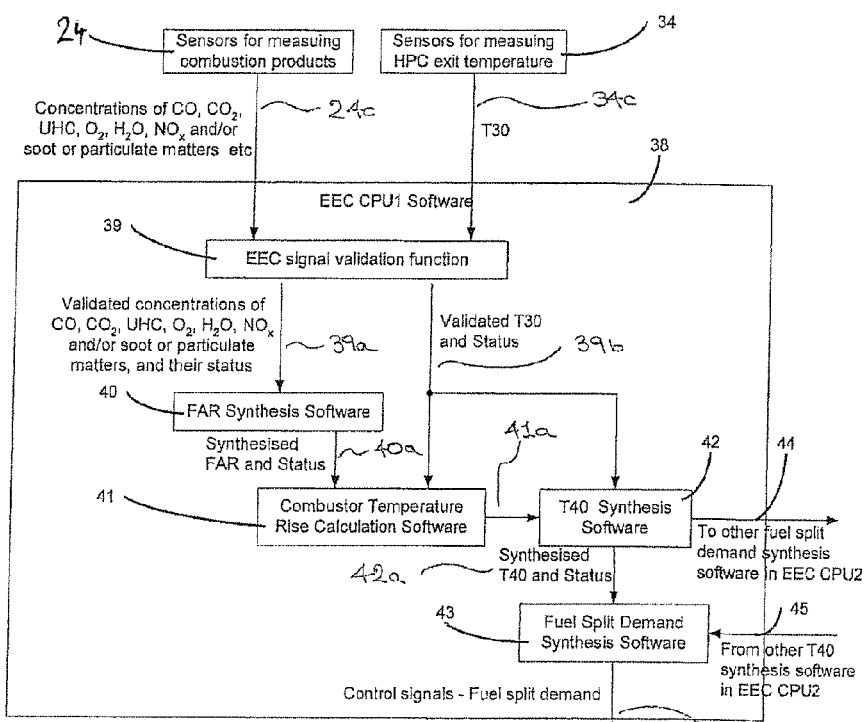

As outlined hereinbefore, it has been found that the output of the temperature sensor 34 and gas sensor 24, in combination, may be used to calculate or derive the combustion flame temperature with a good degree of accuracy, both during steady state conditions and during transient conditions. As a result, use of these parameters, in combination, in controlling the operation of the fuel actuation arrangement 28 can achieve significant benefits over the control of the combustion process. In accordance with this embodiment of the invention, therefore, and as illustrated in FIGS. 4a and 4b, the outputs of the temperature sensor 34 and gas sensor 24 are used as signal inputs 34c, 24c to a control algorithm 38 embedded within the control unit 25. The output of the control algorithm 38 is used as a control signal 38a for the fuel actuation arrangement 28. The control algorithm 38 comprises a number of signal validation and synthesis software routines described in more detail hereafter with reference to FIG. 4b.

Within the control algorithm 38 the signal inputs 34c, 24c are initially validated using a standard signal validation logic 39, in the form of, for example, known fuzzy logic techniques, to filter out any noise-ridden or faulty sensor signals. A validated gas sensor signal 39a is then input into a fuel/air ratio (FAR) synthesis software routine 40 which generates a FAR value based on the composition of the gas downstream of the combustor 15, as measured by the gas sensor 24. The FAR synthesis software routine 40 utilises the measured composition of the gas downstream of the combustor 15 to calculate the molecular ratio of air and fuel in the combustion process. This is effectively a calculation based on the chemical reaction of the different combustion products (ie oxygen, carbon dioxide, etc) in the combustion process.

A synthesised FAR value 40a is then input into a combustor temperature rise calculation software routine 41 along with a validated T30 (temperature at the exit of the high pressure compressor) signal 39b. As well as being used as inputs to the software routine 41, the validated T30 value 39b and synthesised FAR value 40a are used as combustion process status signals for fault accommodation routines (not shown) within the control unit 25.

The software routine 41, which can take the form of a look-up table or a series of mathematical equations, is generated during a calibration operation in which an energy conservation relationship is derived based on the amount of fuel burnt during the combustion process. The calibration operation may take into account factors such as, for example, the proportion of returned cooling air, associated with the engine, often referred to as air flow modulation demand.

The output 41a from the combustor temperature rise calculation software routine 41 is then synthesised with the validated T30 value 39b in a T40 (combustion flame temperature) synthesis software routine 42 to provide a synthesised T40 value 42a. The synthesised T40 value 42a is input into a fuel flow split demand synthesis software routine 43 which generates the fuel flow split demand control signal 38a that is input into the fuel actuation arrangement 28.

Typically in an aircraft engine fuel control system there are two control units 25 providing a dual-channel redundant system. Both of the control units 25 in such a system have an embedded control algorithm 38 of the present invention. To enable signal cross-checking and fault accommodation the synthesised T40 value 42a generated in the control algorithm 38 of one of the control units 25 is transmitted to the fuel flow split demand synthesis software routine 43 in the control algorithm 38 of the other of the control units 25. Likewise the synthesised T40 value 42a generated in the control algorithm 38 of the other of the control units 25 is transmitted to the fuel flow split demand synthesis software routine 43 in the control algorithm 38 of the one of the control units 25. The synthesised T40 values 42a are transmitted between control units 25 by lines 44, 45 as illustrated in FIG. 4b. This sharing of synthesised T40 values 42a between separated control units 25 in a dual-channel system ensures that if a fault occurs in any of the signals or software routines within the control algorithm 38 of one of the control units 25, the control algorithm 38 can continue to function using a valid synthesised T40 value 42a from the other control unit 25 and generate a fuel flow split demand control signal 38a that is input into the fuel actuation arrangement 28.

As the calculated or derived combustion flame temperature value (the synthesised T40 value) 42a is very close to the actual combustion flame temperature, it will be appreciated that control over the combustion process is enhanced. It will be appreciated that as only two inputs are used in the derivation of the synthesised T40 value 42a, the likelihood of a failure causing an error in this value, and the introduction of errors therein as a result of sensor inaccuracies, is much reduced. Further, any deterioration in engine or combustor performance over the life of the engine is accounted for in this invention since this deterioration results in a change in the inputs 24c, 34c to control algorithm 38.

Whilst FIG. 2 shows one embodiment, it will be appreciated that a number of modifications may be made thereto without departing from the invention. For example, whilst FIG. 2 suggests that the gas sensor 24 is located in its entirety at the exit of the low pressure turbine section 18, it could take the form of a probe to be located at the exit of the low pressure turbine section 18 in combination with analysis circuits located remotely therefrom, for example within or adjacent the control unit 25, as shown in FIG. 1. In the arrangement of FIG. 1, the gas sensor 24 is a laser detector based sensor, comprising a probe located remotely from a laser 24a and analysis circuit 24b, optical fibres 23 connecting the laser 24a and circuit 24b to the probe.

Figure 3:
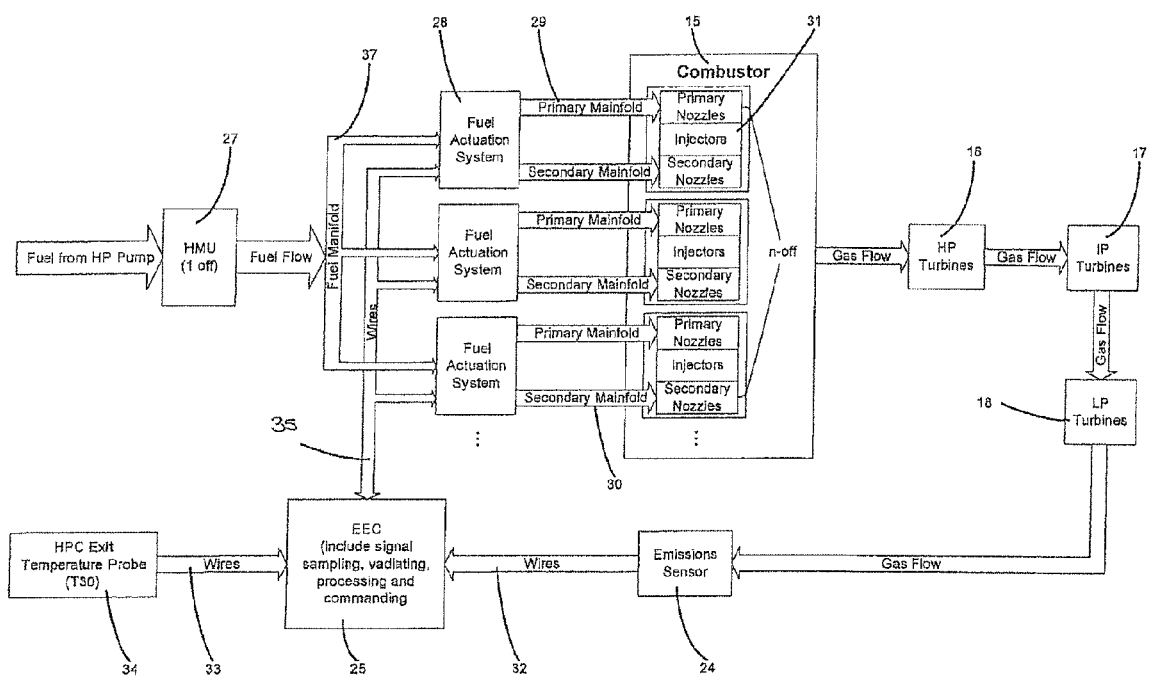
FIG. 3 is a view similar to FIG. 2 of an alternative embodiment.

Another possibility is shown in FIG. 3. In the arrangement of FIG. 2, a single fuel actuation arrangement 28 divides the supplied fuel flow into primary and secondary streams for a plurality of injectors. In the arrangement of FIG. 3, each injector has its own fuel actuation arrangement 28 associated therewith, each fuel actuation arrangement being operable under the control of the control unit 25 using the temperature and gas sensor outputs in controlling the fuel actuation arrangement operations. Such a fuel system is thought to be advantageous in that the number of fuel manifolds crossing the engine bi-duct is reduced which can lead to a reduction in engine and combustor performance deterioration resulting from fuel stagnation.

Although specific embodiments of the invention are described hereinbefore, it will be appreciated that these are merely examples and that a range of modifications and alterations may be made thereto without departing from the scope of the invention as defined by the appended claims. By way of example, the invention may be applied to a wide range of other fuel system architectures. Further, although reference is made to the use of a laser detector type of gas sensor, it will be appreciated that in practise other gas composition measurement devices, such as piezoelectric based vibrating element devices, could be provided.

The invention claimed is:

1. A fuel system comprising:
a fuel actuation arrangement that is configured to split a metered flow of fuel into at least a first stream and a second stream; and
a control unit that controls the operation of the fuel actuation arrangement, wherein
the control unit derives a calculated combustion flame temperature value using a combination of an out gut of a temperature sensor sensitive to a gas temperature downstream of a high pressure compressor of an associated engine and an output of a gas sensor sensitive to at least one parameter of a composition of a gas downstream of a combustor of the engine; and
the control unit is configured to control the operation of the fuel actuation arrangement using the calculated combustion flame temperature value.

2. A system according to claim 1, wherein the temperature sensor is sensitive to a temperature at an exit of the high pressure compressor.

3. A system according to claim 1, wherein the parameter to which the gas sensor is sensitive is a content of the gas downstream of the combustor of at least one of the following: oxygen, carbon dioxide, or carbon monoxide.

4. A system according to claim 1, wherein the gas sensor is located adjacent an exit of a low pressure turbine stage.

5. A system according to claim 4, wherein the gas sensor is located at a gas path of a low pressure turbine outlet guide vane or its exit.

6. A system according to claim 1, wherein the gas sensor is of the laser-detector type.

7. A system according to claim 6, wherein the gas sensor comprises a probe located in the engine, and an analysis device located remotely from the probe.

8. A system according to claim 7, wherein the gas sensor includes one or more optical fibres connecting the probe to the analysis device.

9. A system according to claim 8, wherein a first optical fibre is used to carry a laser output to the probe, and a second optical fibre carries a measurement back to the analysis device.

10. A system according to claim 1, wherein the gas sensor output and the temperature sensor output are used as inputs to a combustor temperature rise calculation software routine to derive a difference value representative of a difference between a sensed temperature and the calculated combustion flame temperature.

11. A system according to claim 10, wherein the calculated combustion flame temperature is calculated by adding the temperature sensor output and the difference value together.

12. A method of controlling an operation of a fuel system, the method comprising the steps of:

sensing a parameter of a composition of an engine gas downstream of a combustor of an engine;
sensing a temperature of the engine gas downstream of a high pressure compressor of the engine;
deriving, on a control unit, a calculated combustion flame temperature value based on a combination of the sensed gas composition parameter and the sensed temperature; and
controlling, with the control unit, the operation of a fuel actuation arrangement to split a fuel supply into a first stream and a second stream, based on the calculated combustion flame temperature value.

13. A method according to claim 12, wherein a combustor temperature rise calculation software routine is used to derive a difference value from the sensed gas composition parameter and the sensed temperature.

14. A method according to claim 13, wherein the difference value is used in combination with the sensed temperature to derive the calculated combustion flame temperature value.

* * * * *